United States Patent [19]
Baldes et al.

[11] Patent Number: 5,499,050
[45] Date of Patent: Mar. 12, 1996

[54] METHOD AND APPARATUS FOR MONITORING VIDEO COMPRESSION PROCESSING

[75] Inventors: Gary C. Baldes, Hillsboro; Ben Echols, Aloha; Arlene Kasai, Beaverton, all of Oreg.

[73] Assignee: Intel Corporation, Santa Clara, Calif.

[21] Appl. No.: 147,678

[22] Filed: Nov. 1, 1993

[51] Int. Cl.$^6$ .............................. H04N 7/12; H04N 17/00
[52] U.S. Cl. ........................................... 348/180; 348/384
[58] Field of Search ...................... 348/180, 192, 348/384, 390, 391; 345/202, 189; 358/451; H04N 7/12, 17/00

[56] References Cited

U.S. PATENT DOCUMENTS

| | | | |
|---|---|---|---|
| 4,942,479 | 7/1990 | Kanno | 358/451 |
| 4,953,019 | 8/1990 | Skikakura et al. | 348/384 |
| 5,051,827 | 9/1991 | Fairhurst | 348/180 |
| 5,081,450 | 1/1992 | Lucas et al. | 345/202 |
| 5,097,518 | 3/1992 | Scott et al. | 358/451 |
| 5,313,280 | 5/1994 | Straus | 348/189 |

*Primary Examiner*—Victor R. Kostak
*Attorney, Agent, or Firm*—Steve Mendelsohn; William H. Murray

[57] ABSTRACT

A method and apparatus for providing accurate, real-time monitoring of image compression processing. Video data is compressed by a microprocessor running a video compression algorithm. A product of this compression process is a decompressed (i.e., companded) image to be used in the compression of the next video image. This companded image is also used by the video capture system for display for real-time monitoring of video compression processing. In a preferred embodiment, every video frame that is compressed, is also displayed in real-time on a display monitor.

14 Claims, 1 Drawing Sheet

METHOD AND APPARATUS FOR MONITORING VIDEO COMPRESSION PROCESSING

BACKGROUND OF THE INVENTION

1. Field of the Invention

The present invention relates to video data processing, and, in particular, to methods and apparatuses for monitoring video compression processing.

2. Description of the Related Art

It is desirable to monitor processing of a compression engine that compresses video data. Such monitoring preferably comprises displaying each video image on a display monitor as the compression engine compresses that video image. It is also desirable to provide an inexpensive method for monitoring video compression processing. One known way to minimize cost is to reduce the amount of special-purpose hardware in the video system.

Some conventional video systems for compressing video data comprise a conventional personal computer (PC) system and special-purpose hardware. The PC system may comprise a host processor running video application software, a storage device, and a display monitor. The special-purpose hardware may comprise a capture engine, a memory device, and a compression engine.

The capture engine captures and stores video data as an uncompressed bitmap in the memory device. The compression engine compresses the uncompressed bitmap data and stores the resulting compressed data back to the memory device. The host processor accesses the compressed data from the memory device and stores the compressed data to the storage device. The host processor also runs decompression software to decompress the compressed data. The host processor then transmits the decompressed data to the display for purposes of displaying the just-captured data (i.e., to monitor the images being captured).

Some conventional video compression systems are unable to provide real-time display of every frame of video data that is compressed by the special-purpose hardware. This is due to the fact that some conventional video compression systems are unable to process the large volume of data associated with video images given high frame rates, image dimensions, and pixel resolutions. As a result, some conventional video compression systems at best provide monitoring in which only some of the processed video frames are decompressed and displayed on the display monitor. As a result, the video imagery displayed for monitoring the compression processing is incomplete and appears disjointed and jerky.

Other conventional video compression systems avoid these processing bandwidth problems by displaying the captured video data (i.e., the uncompressed video data that has not been compressed and decompressed). Such systems may provide smooth capture monitoring in real-time, but the data displayed does not accurately display the compression processing, since the video images generated from compression and decompression processing typically differ from the captured, uncompressed video images.

What is needed is a video compression system that provides accurate real-time monitoring of video compression processing.

It is accordingly an object of this invention to overcome the disadvantages and drawbacks of the known art and to provide a video system that provides real-time monitoring of video compression processing.

It is a further object of the present invention to provide a video compression system that displays video data for every frame that is compressed.

It is a further object of the present invention to provide a video system that displays video data that represents the results of compression processing.

It is a further object of the present invention to provide an inexpensive video system that provides accurate, real-time monitoring of compression processing.

Further objects and advantages of this invention will become apparent from the detailed description of a preferred embodiment which follows.

SUMMARY OF THE INVENTION

The present invention is a method and apparatus for processing a video stream. Uncompressed video data corresponding to the video stream is provided and then compressed with a compression engine. The compressed video data is then decompressed with the compression engine to generate companded video data, which is stored as one or more bitmaps in a memory device. The bitmaps in the memory device are then accessed with a host processor and the companded video data is displayed on a display monitor.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

Figure 1:
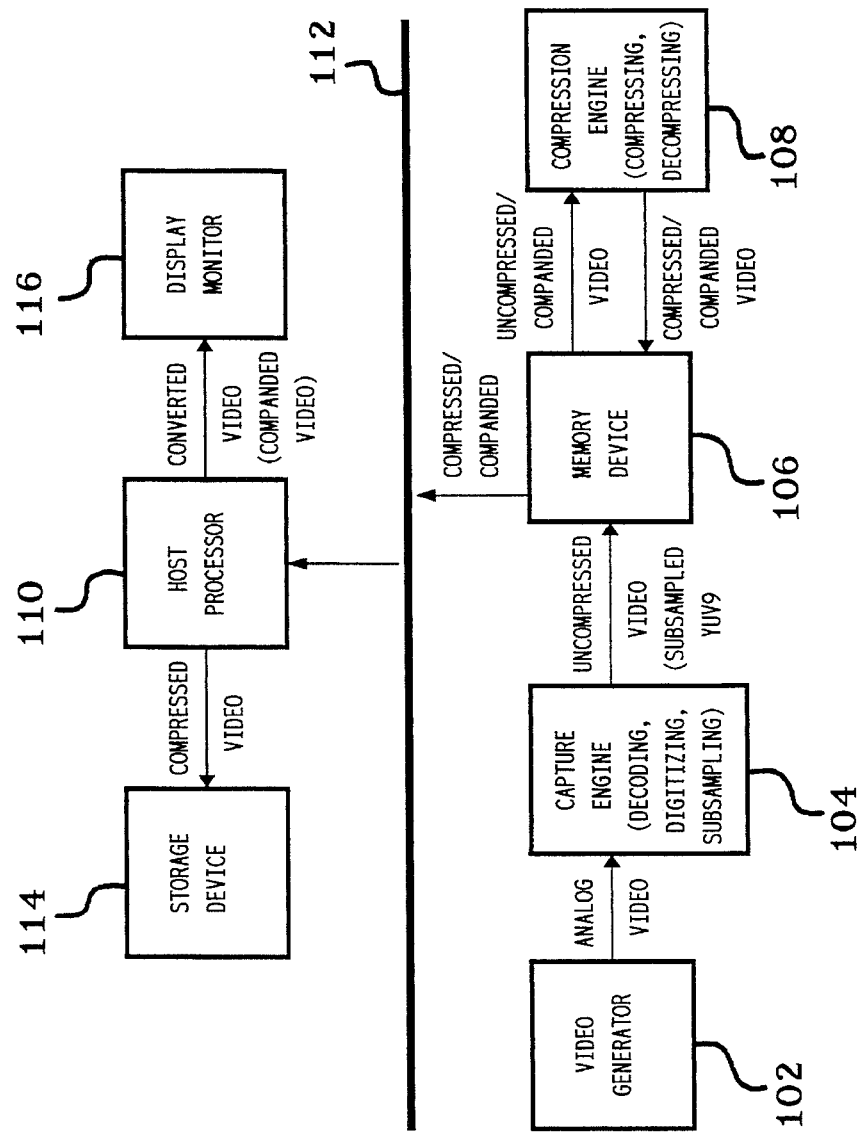
FIG. 1 is a block diagram of the flow of video data through a video system according to a preferred embodiment of the present invention.

Referring now to FIG. 1, there is shown a block diagram of the flow of video data through video system 100, according to a preferred embodiment of the present invention. Video system 100 compresses video data and provides real-time monitoring by displaying the companded data (i.e., the video data that are decompressed during compression processing).

More particularly, video generator 102 of video system 100 generates an analog video signal. Capture engine 104 decodes the analog video signal into three analog color components (e.g., Y, U, and V of subsampled YUV9 video data), digitizes the analog component signals, captures the digitized component data as uncompressed data, and stores the uncompressed data as uncompressed bitmaps in memory device 106.

Compression engine 108 accesses the uncompressed data from memory device 106, compresses the uncompressed data, and stores the resulting compressed data as a compressed bitstream in memory device 106. In addition, compression engine 108 decompresses the compressed data to generate companded data and stores the companded data as companded bitmaps (one for each video color component) in memory device 106 for use in compressing the next video frame.

When the compressed bitstream and companded bitmaps for a given video frame are completed, the application software running on host processor 110 is informed of the bitstream and bitmap locations in memory device 106. Host processor 110 then accesses the compressed bitstream from memory device 106 via system bus 112 and stores the compressed bitstream to storage device 114. In addition, host processor 110 accesses the companded bitmaps from memory device 106 and transmits the converted data to display monitor 116 for display.

Video generator 102 may be any conventional source of analog video signals such as a video camera or VCR. Capture engine 104 may be any suitable apparatus for decoding, digitizing, and capturing video data and is preferably an Intel® Smart Video Recorder (ISVR). Memory device 106 may be any suitable memory device and is preferably a dual-port video random access memory (VRAM) device. Compression engine 108 may be any suitable device for compressing and companding video data and is preferably an Intel® 82750PB pixel processor.

Host processor 110 may be any suitable processor and is preferably an Intel® IA processor, where an Intel® IA processor is either an Intel® 286, 386, 486, or Pentium® processor. The video application software running on host processor 110 may be any software package for processing video imagery and is preferably Microsoft® Video for Windows. Storage device 114 may be any suitable read/write mass storage device such as a hard drive or CD-ROM and is preferably a Seagate SCSI Hard Drive. Display monitor 116 may be any suitable device for displaying video images and is preferably an NEC Multisync 4FGe. System bus 112 may be any suitable data bus and is preferably an industry standard architecture (ISA) bus such as an Extended ISA (EISA).

Those skilled in the art will understand that compression engine 108 generates companded bitmaps for reference during compression processing of video data. In the present invention, besides using the companded bitmaps for reference, the companded bitmaps are accessed by host processor 110 for display to provide real-time monitoring of the compression processing. In a preferred embodiment, every video frame that is captured, compressed, and decompressed by the special-purpose hardware (i.e., capture engine 104 and compression engine 108) is also displayed on display monitor 116. In this way, video system 100 provides accurate, real-time monitoring of the compression processing.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing a video stream, comprising the steps of:
   (a) providing uncompressed video data corresponding to said video stream;
   (b) compressing said uncompressed video data with a compression engine;
   (c) decompressing said compressed video data with said compression engine to generate companded video data used in compressing said uncompressed video data;
   (d) storing said companded video data as one or more bitmaps in a memory device;
   (e) accessing said bitmaps in said memory device with a host processor; and
   (f) displaying said companded video data on a display monitor.

2. The method of claim 1, wherein step (a) comprises the steps of:
   (1) generating an analog video signal corresponding to said video stream;
   (2) decoding and digitizing said analog video signal;
   (3) capturing said decoded and digitized video data as uncompressed video data; and
   (4) storing said uncompressed video data as one or more captured bitmaps in said memory device.

3. The method of claim 1, wherein said uncompressed video data comprises subsampled video data.

4. The method of claim 3, wherein said uncompressed video data is in YUV9 format.

5. The method of claim 1, wherein step (b) further comprises the step of storing said compressed video data as one or more compressed bitstreams in said memory device.

6. The method of claim 5, further comprising the steps of:
   (g) accessing said compressed bitstreams in said memory device with said host processor; and
   (h) storing said compressed bitstream in a storage device.

7. A method for processing a video stream, comprising the steps of:
   (a) generating an analog video signal corresponding to said video stream;
   (b) decoding and digitizing said analog video signal;
   (c) capturing said decoded and digitized video data as uncompressed video data;
   (d) storing said uncompressed video data as one or more captured bitmaps in a memory device;
   (e) compressing said uncompressed video data with a compression engine;
   (f) storing said compressed video data as one or more compressed bitstreams in said memory device;
   (g) decompressing said compressed video data with said compression engine to generate companded video data used in compressing said uncompressed video data;
   (h) storing said companded video data as one or more bitmaps in said memory device;
   (i) accessing said compressed bitstreams in said memory device with a host processor;
   (j) storing said compressed bitstreams in a storage device;
   (k) accessing said bitmaps in said memory device with said host processor; and
   (l) displaying said companded video data on a display monitor.

8. An apparatus for processing a video stream, comprising:
   (a) means for providing uncompressed video data corresponding to said video stream;
   (b) a compression engine for compressing said uncompressed video data and for decompressing said compressed video data to generate companded video data used in compressing said uncompressed video data;
   (c) a memory device for storing said companded video data as one or more bitmaps; and
   (d) a host processor for accessing said companded bitmaps in said memory device for display on a display monitor.

9. The apparatus of claim 8, further comprising:
   (e) a video generator for generating an analog video signal corresponding to said video stream; and
   (f) a capture engine for decoding and digitizing said analog video signal and for capturing said decoded and digitized video data as uncompressed video data, wherein said uncompressed video data is stored as one or more captured bitmaps in said memory device.

10. The apparatus of claim 8, wherein said uncompressed video data comprises subsampled video data.

11. The apparatus of claim 10, wherein said uncompressed video data is in YUV9 format.

12. The apparatus of claim 8, wherein said compressed video data is stored as one or more compressed bitstreams in said memory device.

13. The apparatus of claim 12, wherein said host processor accesses said compressed bitstreams in said memory device and stores said compressed bitstream in a storage device.

14. An apparatus for processing a video stream, comprising:

(a) a video generator for generating an analog video signal corresponding to said video stream;

(b) a capture engine for decoding and digitizing said analog video signal and for capturing said decoded and digitized video data as uncompressed video data;

(c) a memory device for storing said uncompressed video data as one or more captured bitmaps;

(d) a compression engine for compressing said uncompressed video data and for decompressing said compressed video data to generate companded video data used in compressing said uncompressed video data, wherein said compressed video data is stored as one or more compressed bitstreams in said memory device and said companded video data is stored as one or more bitmaps in said memory device; and (e) a host processor for accessing said compressed bitstreams in said memory device, for storing said compressed bitstreams in a storage device, and for accessing said bitmaps in said memory device for display on a display monitor.

* * * * *